Feb. 28, 1928.

W. E. BURT 1,661,030

WEED DESTROYER

Filed June 28, 1926

WITNESSES:
R. E. Wise.

INVENTOR
William E. Burt
BY Victor J. Evans
ATTORNEY

Feb. 28, 1928.

W. E. BURT 1,661,030

WEED DESTROYER

Filed June 28, 1926  2 Sheets-Sheet 2

WITNESS:
R. E. Wise.

William E. Burt, INVENTOR

BY Victor J. Evans
ATTORNEY

Patented Feb. 28, 1928.

1,661,030

UNITED STATES PATENT OFFICE.

WILLIAM E. BURT, OF YUBA, WISCONSIN.

WEED DESTROYER.

Application filed June 28, 1926. Serial No. 119,222.

This invention relates to a method of and means for destroying weeds and other obnoxious plants, the general object of the invention being to provide means for producing an oscillatory current of electricity, with means for causing it to pass through the root system of a plant so that the same will be killed by the current.

This invention is designed to kill weeds, such as Canadian thistles, which are very hard to destroy by known methods.

Another object of the invention is to provide a knife for cutting off the plant adjacent the ground, with means for causing the current to pass through the knife to the plant as the plant is being cut.

A further object of the invention is to provide a portable current producing plant so that the same can be transported to the field in which the weeds are to be killed.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

The method of destroying plants consists in causing a current of electricity to pass through the root system of a plant so that the same will be killed and this method is carried out by attaching one terminal of a circuit to a rod which is driven into the ground adjacent the plant and attaching the other terminal to a knife which is used to cut off the plant a slight distance from the ground, the act of cutting the plant completing the circuit from the knife through the stump and root system of the plant, the ground and the rod. I have found that an oscillatory current is necessary to kill the plants under all conditions of the soil.

Figure 5:
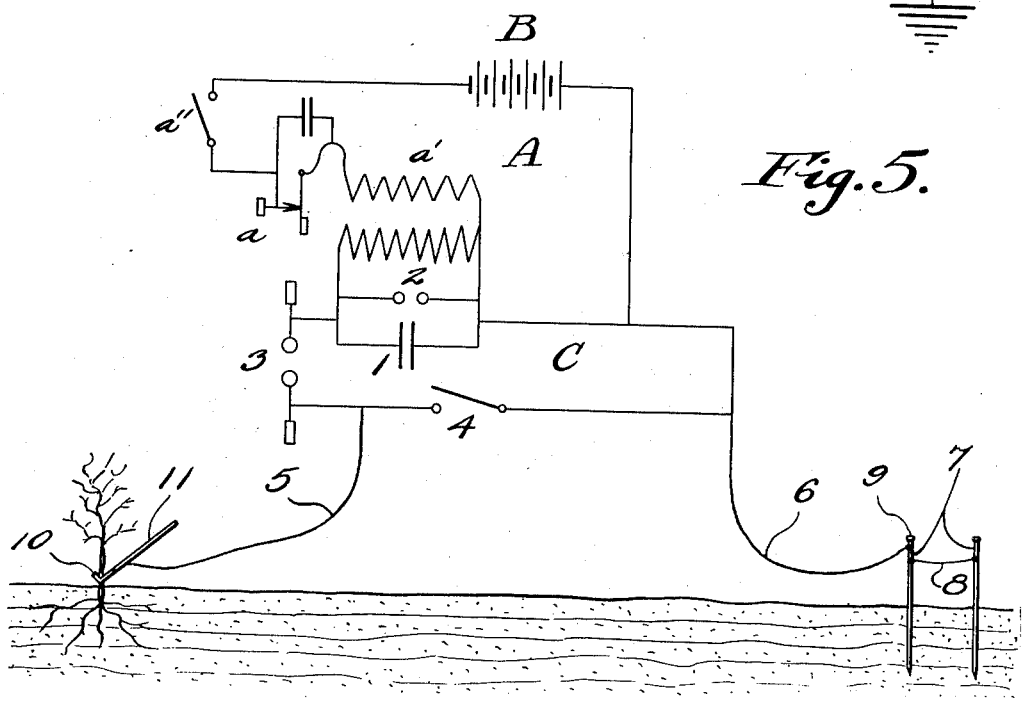
Figure 5 is a diagrammatic view of the circuits of a simpler form of the invention.

Figure 5 shows diagrammatically the simplest arrangement for carrying out the invention. In this view, the primary circuit is shown at A and comprises the battery B, vibrator $a$, and the switch $a''$. The transformer is shown at $a'$. The secondary circuit C comprises the condenser 1, a safety spark gap 2, the adjustable spark gap 3 and the switch 4. A connector 5 is attached to the circuit between the spark gap 3 and a switch 4 and a connector 6 grounds the circuit to a pair of rods 7 which are connected together by the conductor 8 and which are adapted to be driven into the ground. Each rod is provided with a head 9 so that it can be pulled from the ground. A knife 10, having an insulated handle 11, is used to cut the plant, the metal part being of L-shape and the conductor 5 is connected with the insulated-handle 11 and is fastened to the metal part, as shown at 12, so that said metal part forms part of the circuit.

When the knife is held out of contact with the ground or other conducting surface and the switch 4 is closed, the charge accumulated in the secondary will oscillate through the circuit. Then when the knife is used to cut off the plant and the switch 4 opened, as soon as the knife comes in contact with the plant and passes through the same, the accumulated charge will pass over the gap 3 and pass through conductor 5, the metal part of the knife, through the stump and root system of the plant, through the ground to the rods and back over the conductor 6. Thus a powerful current is passed through the root system of the plant which will kill the plant, and with this invention, plants can be quickly exterminated from a field. The operator can use a knife on a number of plants adjacent the rods without changing the position of the rods, so that a patch of plants can be killed with this apparatus very quickly and without changing the position of the rods and of the current producing parts. If the apparatus is large enough to produce sufficient current, several knives can be attached to the same, so that several operators can attack the weeds at once.

I prefer to test out the soil and roots before beginning operations, whenever it is considered necessary by first ascertaining the relative moisture content of the soil and roots. This can be done with a pair of laboratory scales and a suitable drying oven. Second, different degrees of moisture and various kinds of plants possess a very wide range of resistance around the root circuit, so that the proper number of cutting knives can be determined for successful work. The resistance, and in turn the adjustment of spark gap and condensers, can be had by the use of the rods, a small battery and milliammeter, with suitable connection.

Figure 1:
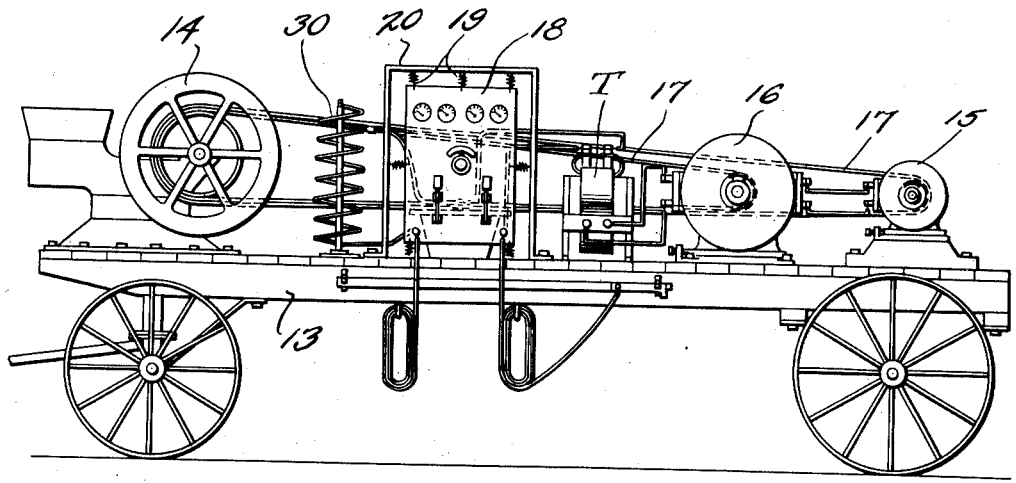
Figure 1 is a view of the portable outfit, for producing the current.
Figure 2:
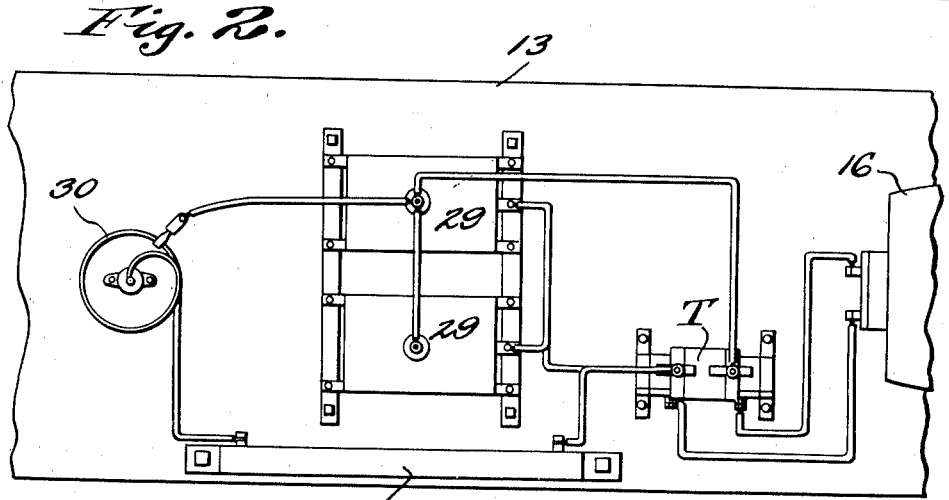
Figure 2 is a plan view of parts shown in Figure 1.
Figure 3:
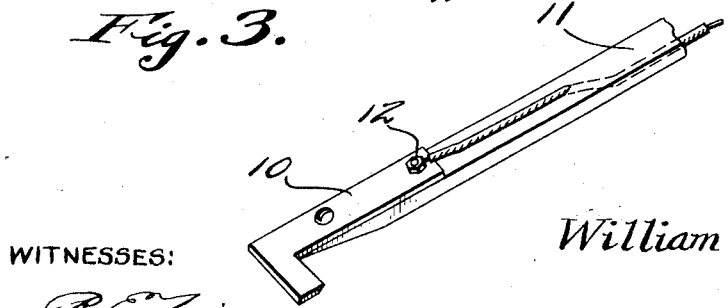
Figure 3 is a view of the knife.
Figure 4:
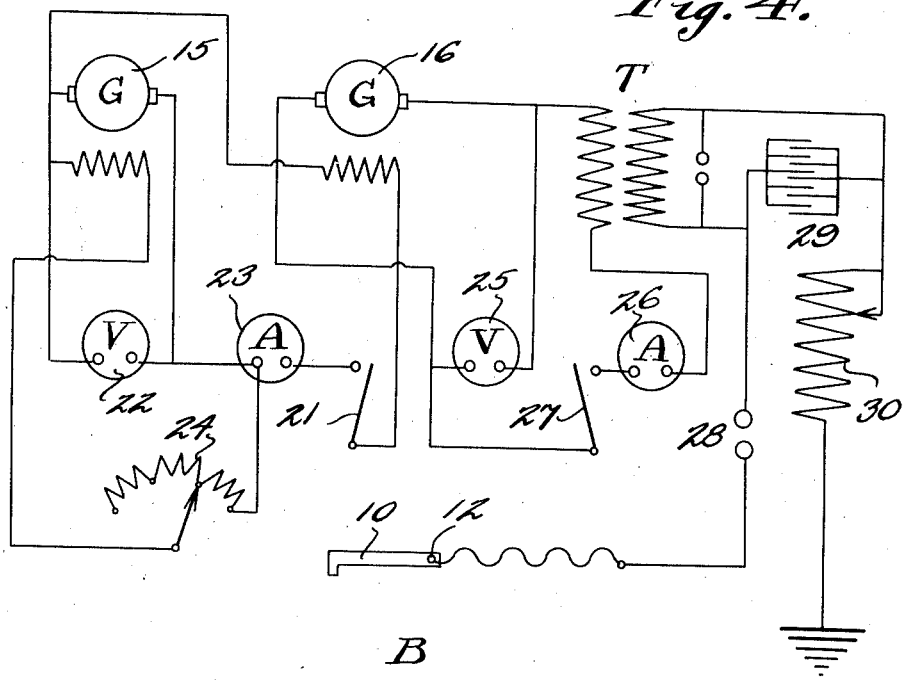
Figure 4 is a diagrammatic view of the circuits.

Figures 1 and 2 show an arrangement for producing a powerful current which is mounted on a wagon or truck 13 so that it can be transported from place to place. This outfit comprises a motor 14, a D. C. generator or exciter 15 and an A. C. generator 16. These generators are driven from the motor by belts 17 or the like and the switch board 18 is supported by the springs 19 from a frame 20 on the truck. A shown in Figure 4, the generator or exciter 15 is electrically connected with the field of the generator 16, a switch 21 being arranged in the connection, and said generator is provided with the volt meter 22, the ammeter 23 and the rheostat 24, and generator 16 is provided with the volt meter 25, the ammeter 26 and the switch 27. The secondary is arranged as before described, the transformer being shown at T, the adjustable gap at 28, the condensers at 29 and the inductance coil at 30. This device will produce a much more powerful current than that shown in Figure 5, though the method is the same.

Of course, other arrangements for producing electric energy can be used to carry out the method of killing obnoxious plants, though, as before stated, an oscillatory current should be used.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. Means for exterminating plants by electricity, comprising an A. C. generator, a D. C. exciter generator connected therewith, a motor for operating the generators, a transformer connected with the A. C. generator, a condenser connected with the transformer, a cutter electrically connected with the condenser, a spark gap in the connection and a ground rod electrically connected with the condenser.

2. Means for exterminating plants by electricity, comprising an A. C. generator, a D. C. exciter generator connected therewith, a motor for operating the generators, a transformer connected with the A. C. generator, a condenser connected with the transformer, a cutter electrically connected with the condenser, a spark gap in the connection, a ground rod electrically connected with the condenser, and a truck for supporting the parts.

In testimony whereof I affix my signature.

WILLIAM E. BURT.